United States Patent [19]

Murray

[11] Patent Number: 4,917,218

[45] Date of Patent: Apr. 17, 1990

[54] SECONDARY OIL SYSTEM FOR GAS TURBINE ENGINE

[75] Inventor: Stephen G. Murray, Indianapolis, Ind.

[73] Assignee: General Motors Corporation, Detroit, Mich.

[21] Appl. No.: 331,781

[22] Filed: Apr. 3, 1989

[51] Int. Cl.$^4$ .............................................. F01M 9/10
[52] U.S. Cl. .................................. 184/6.11; 184/107; 415/175; 60/39.08
[58] Field of Search ...................... 184/5.1, 6.11, 107; 464/7, 179, 183; 415/175; 416/174 A; 60/39.08

[56] References Cited

U.S. PATENT DOCUMENTS

| | | | |
|---|---|---|---|
| 526,921 | 10/1894 | Gregg | 184/107 |
| 995,459 | 6/1911 | Henderson | 184/107 |
| 3,779,345 | 12/1973 | Barnes et al. | 184/6.4 |
| 4,157,881 | 6/1979 | Kasuya | 184/6.11 |
| 4,717,000 | 1/1988 | Waddington et al. | 184/61 |
| 4,741,155 | 1/1988 | McCarty | 60/39.02 |

Primary Examiner—Ira S. Lazarus
Assistant Examiner—Alan Cariaso
Attorney, Agent, or Firm—Saul Schwartz

[57] ABSTRACT

A secondary oil system for a gas turbine engine includes a dual phase blocking member in a passage between an oil reservoir and a secondary orifice adjacent a bearing of the engine. The blocking member has a first phase at temperatures below a threshold temperature of the bearing in which the blocking member prevents secondary oil flow and a second phase at temperatures above the threshold temperature in which the blocking member permits secondary oil flow. Normally, primary oil flow maintains the bearing at an operating temperature below the threshold temperature so that secondary oil flow is normally blocked. After primary oil flow stops, the bearing temperature increases to the threshold temperature and the blocking member transitions to its second phase to initiate secondary lubrication.

5 Claims, 1 Drawing Sheet

SECONDARY OIL SYSTEM FOR GAS TURBINE ENGINE

This invention was made in the course of work under a contract or subcontract of the United States Department of Defense.

FIELD OF THE INVENTION

This invention relates to secondary oil systems in gas turbine engines.

BACKGROUND OF THE INVENTION

U.S. patent application Ser. No. 222,994, filed July 22, 1988 now U.S. Pat. No. 4,858,426 by W. N. Holcomb and assigned to the assignee of this invention, describes a secondary oil system for a flight propulsion gas turbine engine which provides secondary oil flow to a bearing of the engine after interruption of regular or primary oil flow. That system includes an annular reservoir in a sump of the engine surrounding the bearing and a passage from the bottom of the reservoir to a secondary orifice near the bearing. The reservoir is filled from the primary oil system of the engine and continuously drains by gravity through the secondary orifice. The secondary oil system thus operates in parallel with the primary oil system and necessarily commences operation at the instant primary oil flow is interrupted, whether or not secondary oil flow is actually required at that instant. Premature commencement of secondary oil flow may minimize the duration of engine operation after primary oil flow stops. A secondary oil system according to this invention delays the onset of secondary oil flow after primary oil flow stops to maximize the aforesaid duration of engine operation after interruption of primary oil flow.

SUMMARY OF THE INVENTION

This invention is a new and improved secondary oil system for a gas turbine engine having a rotating element which assumes a normal operating temperature in the presence of primary oil flow and which increases in temperature to a higher temperature constituting a signal for commencement of secondary oil flow after primary oil flow stops. The secondary oil system according to this invention includes a reservoir connected to and maintained full by the primary oil system, a secondary orifice near the rotating element, a passage between the reservoir and the secondary orifice for conducting secondary oil flow from the reservoir to the secondary orifice, and a blocking member in the passage normally preventing secondary oil flow and responsive to the temperature signal from the rotating element to initiate secondary oil flow by unblocking the secondary passage at the aforesaid higher temperature of the rotating element. In a preferred embodiment of the secondary oil system according to this invention, the blocking member is a dual phase slug of low melting temperature metal having a first phase at the normal operating temperature of the bearing wherein the slug blocks the secondary oil passage and a second phase at the aforesaid higher temperature of the bearing wherein the blocking member is ineffective to block the passage. The dual phase blocking member has a side in direct contact with the bearing for communicating the temperature signal from the bearing to the blocking member.

DESCRIPTION OF A PREFERRED EMBODIMENT

Figures 1, 2:
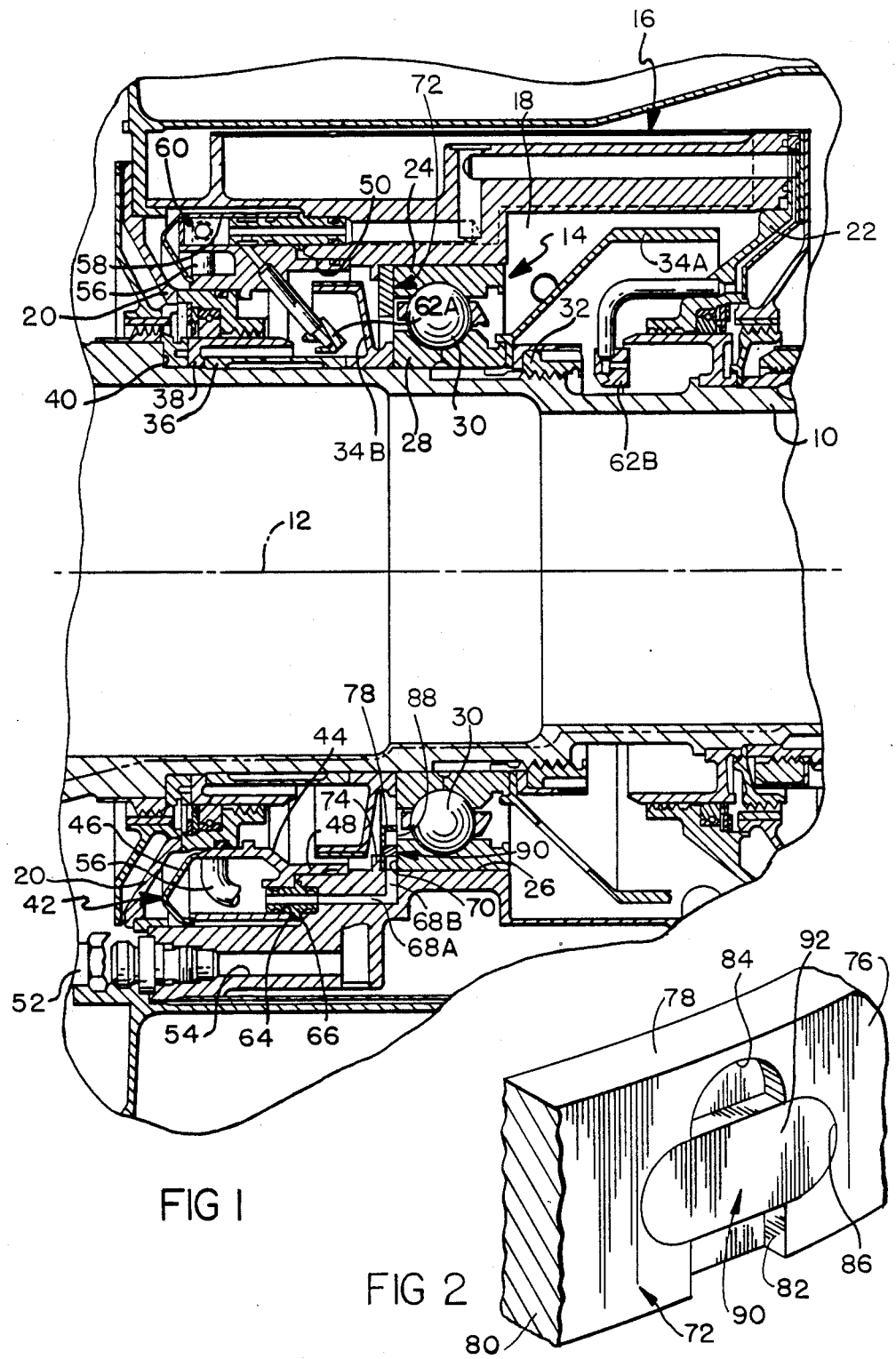
FIG. 1 is a fragmentary elevational view of a gas turbine engine showing a bearing in a sump of the engine and a secondary oil distribution system according to this invention.
FIG. 2 is an enlarged perspective view of a portion of FIG. 1.

A fragmentarily illustrated gas turbine engine, which may be an aircraft flight propulsion engine, includes a tubular shaft 10 rotatable about an axis 12 of the engine. The shaft 10 is supported on the engine by a plurality of bearings including a bearing 14 disposed between the shaft 10 and a rigid annular housing 16 of the engine. The annulus defined between the shaft 10 and the housing 16 defines a sump 18 in which the bearing 14 is disposed. The sump 18 is closed at the front by an annular partition 20 attached to the housing 16 and carrying a plurality of seals which prevent escape of oil between the shaft 10 and partition 20 to areas of the engine ahead of the partition. The sump 18 is closed at the back by an annular partition 22 attached to the housing 16 and carrying a plurality of seals which prevent escape of oil between the shaft 10 and partition 22 to areas of the engine behind the partition.

The bearing 14 has an outer race 24 non-rotatably mounted on an inner cylindrical wall 26 of the housing 16, an inner race 28 rigidly attached to the shaft 10, and a plurality of bearing balls 30 between the races. The inner race is retained on the shaft 10 by a nut 32 threaded on the shaft which captures the inner race 28, pair of oil scavenge impellers 34A-B, a spacer 36 and a seal runner 38 against a shoulder 40 of the shaft.

As described in the aforesaid U.S. patent application Ser. No. 222,994, an annular reservoir 42 is disposed in the sump 18 adjacent the bearing 14. The reservoir 42 has a U-shaped, in cross section, main body portion 44 the open end of which is closed by a wall 46. An annular pilot flange 48 of the main body portion 44 is closely received in a pilot diameter 50 of the housing 16 whereby the reservoir is supported in the sump around the shaft 10. The interior of the reservoir 42 is vented to atmosphere through a vent, not shown, at the top of the tank.

The primary oil system of the engine, i.e. the system which normally provides oil under pressure to lubricate and cool moving parts of the engine such as the bearing 14, includes a first pipe 52 connected to a passage 54 in the housing 16. The passage 54 is likewise connected to a second pipe 56 which traverses a portion of the interior of the reservoir 42. The second pipe 56 enters the reservoir near the bottom thereof through a conventional sealed connection, not shown, through the main body portion 44. At the top of the reservoir 42, the second pipe 56 is rigidly attached to the main body portion 44 and opens into a bore 58 in the latter facing the housing 16. A feed hole 60 in the bore 58 defines an inlet port to the reservoir 42 through which the primary oil system fills the reservoir and maintains the reservoir full during normal engine operation.

The bore 58 is connected by appropriate passages in the housing 16 to a pair of nozzles 62A-B on the housing 16. The nozzles are part of the primary oil system of the engine and discharge a primary flow of lubricating and cooling oil for the bearing 14 and other elements of the engine during normal operation.

A secondary oil system according to this invention includes, in addition to the reservoir 42, a bore 64 in the body portion 44 facing the housing 16 at the bottom of the reservoir. A jumper tube 66 is disposed in the bore 64 and in a counterbore in the housing 16 at the end of a horizontal portion 68A of a secondary passage in the housing 16. The jumper tube 66 has a passage therethrough which defines a discharge orifice at the bottom of the reservoir through which gravity induced secondary oil flow is conducted from the reservoir into the horizontal portion 68A of the secondary passage and into a vertical portion 68B of the secondary passage. The vertical portion 68B intersects the inner cylindrical wall 26 of the housing 16 adjacent an annular face 70 of the bearing outer race 24.

The secondary oil system according to this invention further includes a planar annular ring 72 seated on the inner cylindrical wall 26 between the annular face 70 of the bearing outer race 24 and an annular retaining flange 74 on the housing 16. The ring 72 has an annular face 76 bounded by an inner circumferential edge 78 and an outer circumferential edge 80 of the ring. The inner circumferential edge 78 is disposed radially inboard of the inner circumferential edge of the annular face 70 of the bearing outer race 24. A radial slot 82, FIG. 2, is formed in the annular face 76 of the ring and extends from the outer circumferential edge 80 thereof to a closed end 84. A transverse slot 86 formed in the annular face 76 intersects the radial slot 82 between the closed end 84 and the outer circumferential edge 80.

The ring 72 is angularly indexed to effect registry between the radial slot 82 and the vertical portion 68B of the secondary oil passage. The annular face 70 of the bearing outer race 24 closes the open side of radial slot 82 so that the slot defines a continuation or extension of the vertical portion 68B of the secondary oil passage. The closed end 84 of the radial slot 82 is disposed radially inboard of the inner circumferential edge of the annular face 70 of the bearing outer race so that the secondary oil passage terminates at a secondary orifice 88, FIG. 1, adjacent the bearing balls 30.

As seen best in FIG. 2, the secondary oil system further includes a planar, dual phase blocking member 90 disposed in the transverse slot 86. The blocking member has a back side, not shown, abutting the bottoms of the radial and transverse slots 82 and 86 and a front side 92 abutting the annular face 70 of the bearing outer race. The blocking member is a slug of low melting temperature metal such as Tin which melts at 449° and has a first phase, FIGS. 1 and 2, in which the slug is solid enough to block secondary oil flow in the secondary passage and a second phase, not shown, in which the slug does not block secondary oil flow. The blocking member, in the second phase thereof, may be fully or only partially melted. The blocking member 90 transitions from the first phase to the second phase at a preselected transition temperature.

In the absence of primary oil flow, the temperature of the bearing 14 represents a signal indicative of the operational state of the bearing. For example, as long as the temperature of the bearing is below a known threshold temperature above the normal operating temperature, the bearing can be expected to continue to function, albeit at a diminished capacity. At temperatures above the threshold temperature, the bearing can not be expected to function for any appreciable duration even at a diminished capacity. In the secondary oil system, the transition temperature of the blocking member 90 is selected to not exceed the threshold temperature of the bearing 14.

The secondary oil system according to this invention operates as follows. During engine operation, primary oil flow keeps the bearing 14 at its normal operating temperature. The reservoir 42 is filled through the hole 60 in the bore 58. The blocking member 90, being in direct contact with the bearing outer race 24, assumes substantially the normal operating temperature of the bearing and, therefore, prevents secondary oil flow in the secondary passage.

At the onset of an interruption of primary oil flow, friction and diminished cooling cause the operating temperature of the bearing to begin increasing above the normal temperature toward the threshold temperature. The time required for the bearing to reach the threshold temperature depends on many factors including the quantity of residual oil in and around the bearing. When the bearing outer race achieves the transition temperature, the blocking member 90 transitions from its first phase to its second phase thereby unblocking the secondary passage to initiate gravity induced secondary oil flow from the reservoir 42. The secondary oil flow sustains the bearing 14 until the reservoir is empty. The total duration of engine operation sustained after cessation of primary oil flow equals the time required for the bearing to achieve the threshold temperature and the time required for the reservoir to fully empty.

The particular means used for motivating oil into secondary passage is optional. For example, the reservoir could be connected to the compressor of the engine such that the oil in the reservoir is maintained above atmospheric pressure. In that case, oil is positively forced from the reservoir when the blocking member transitions from its first phase to its second phase. Alternatively, the secondary passage could be part of an aspiration system in which compressed air flowing through the secondary passage after the blocking member achieves its second phase entrains a mist consisting of the compressed air and oil droplets aspirated from the reservoir.

The embodiments of the invention in which an exclusive property or privilege is claimed are defined as follows:

1. In a gas turbine engine including a rotating element having a normal operating temperature in the presence of a primary oil flow from a primary oil system of said engine and increasing in temperature to a higher threshold temperature after said primary oil flow stops,
a secondary oil system comprising:
an oil reservoir on said engine,
means connecting said primary oil system to said reservoir and operative to maintain said reservoir filled with oil when said engine is operating,
means defining a secondary orifice on said engine operative when supplied with oil to conduct a secondary oil flow to said rotating element,
means defining a passage between said reservoir and said secondary orifice for conducting said secondary oil flow to said secondary orifice,
means operative to motivate said secondary oil flow through said passage from said reservoir to said secondary orifice,
a dual phase blocking member in said passage having a first phase at temperatures below said threshold temperature preventing said secondary oil flow and a second phase at temperatures exceeding said threshold temperature permitting said secondary oil flow, and heat transfer means between said blocking member and said rotating element operative to maintain said blocking member substantially at the temperature of said rotating element so that said secondary oil flow is initiated when said rotating element achieves said threshold temperature.

2. The secondary oil system recited in claim 1 wherein said rotating element is a bearing between a shaft and a rigid housing portion of said engine.

3. The secondary oil system recited in claim 2 wherein said means operative to motivate said secondary oil flow through said passage from said reservoir to said secondary orifice is gravity.

4. The secondary oil system recited in claim 2 wherein said means operative to motivate said secondary oil flow through said passage from said reservoir to said secondary orifice is air pressure in said reservoir.

5. In a gas turbine engine including a shaft aligned on an axis of said engine, a generally annular rigid housing of said engine surrounding said shaft, seal means at opposite ends of said housing engaging said shaft and defining therebetween an annular sump around said shaft, a bearing in said sump for rotatably supporting said shaft on said rigid housing and including an inner race on said shaft and an outer race on said rigid housing and a plurality of anti-friction rolling elements between said inner and said outer races, and a primary oil system including a plurality of nozzles in said sump operative to discharge a primary oil flow to said bearing so that said bearing has a normal operating temperature in the presence of said primary oil flow and increases in temperature to a higher threshold temperature when after said primary oil flow stops, a secondary oil system comprising:

an annular reservoir disposed is said sump and attached to said rigid housing, means connecting said primary oil system to said reservoir and operative to maintain said reservoir filled with oil when said engine is operating, means defining a secondary orifice in said housing adjacent said bearing outer race, means on said rigid housing cooperating therewith in defining a passage between the bottom of said reservoir and said secondary orifice including a segment wherein a part of said passage is defined by said means on said rigid housing and a part of said passage is defined by an annular face of said bearing outer race, said oil in said reservoir being motivated by gravity to flow through said passage from said reservoir to said secondary orifice, means defining a transverse slot intersecting said segment of said passage and open toward said annular face of said bearing outer race, and a low melting temperature metal slug disposed in said transverse slot with a side thereof abutting said annular face of said bearing outer race so that the temperature of said metal slug substantially equals the temperature of said bearing outer race, said metal slug having a first phase at temperatures below said threshold temperature blocking said segment of said passage and preventing said secondary oil flow and a second phase at temperatures exceeding said threshold temperature unblocking said segment of said passage and permitting said secondary oil flow.

* * * * *